(12) United States Patent  
Hernandez et al.

(10) Patent No.: US 8,861,523 B2  
(45) Date of Patent: *Oct. 14, 2014

(54) AUTONOMOUS ROUTING OF NETWORK MESSAGES

(76) Inventors: Albert A. Hernandez, Tustin, CA (US); George P. Mulopulos, Las Vegas, NV (US); Gregory Cooper, Santa Ana, CA (US); Laszlo R. Gasztonyi, Fairfax Station, VA (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/605,177

(22) Filed: Oct. 23, 2009

(65) Prior Publication Data

US 2010/0042699 A1    Feb. 18, 2010

Related U.S. Application Data

(63) Continuation of application No. 11/233,775, filed on Sep. 22, 2005, now Pat. No. 7,630,371.

(51) Int. Cl.
| | |
|---|---|
| H04L 12/28 | (2006.01) |
| G06Q 10/10 | (2012.01) |
| H04L 12/58 | (2006.01) |
| H04L 29/08 | (2006.01) |
| H04L 12/701 | (2013.01) |

(52) U.S. Cl.
CPC ............ G06Q 10/10 (2013.01); H04L 12/5855 (2013.01); H04L 51/14 (2013.01); H04L 67/327 (2013.01); H04L 45/00 (2013.01)
USPC ............ 370/392; 370/401; 370/471; 370/474

(58) Field of Classification Search
None
See application file for complete search history.

(56) References Cited

U.S. PATENT DOCUMENTS

| 5,724,575 A | * | 3/1998 | Hoover et al. ................ 709/205 |
| 6,092,103 A | * | 7/2000 | Pritsch ......................... 709/206 |
| 6,424,996 B1 | * | 7/2002 | Killcommons et al. ...... 709/206 |

(Continued)

FOREIGN PATENT DOCUMENTS

| GB | 2392519 A | 3/2004 |
| WO | 2005/060157 A1 | 6/2005 |

OTHER PUBLICATIONS

Carzaniga, et al., "A Routing Scheme for Content-Based Networking," Department of Computer Science, University of Colorado, pp. 1-17, 2003.

(Continued)

*Primary Examiner* — Andrew Chriss  
*Assistant Examiner* — Salvador E Rivas  
(74) *Attorney, Agent, or Firm* — The Marbury Law Group, PLLC

(57) ABSTRACT

Messages from a network are processed so that each received message is received in one of a plurality of message formats, the content of each message is determined, and a network destination to which the message will be directed is selected, based on the determined message content. The message can be transformed to encompass a variety of format changes. Once content of the message is determined, if image data is detected in the message, then image analysis on the image data can be performed to detect message content that is used in selecting a destination. It can be determined if the message has been received for greater than a predetermined time limit without being directed to a selected destination and, if so, a notification action can be performed if the predetermined time limit has been exceeded.

86 Claims, 7 Drawing Sheets

(56) References Cited

U.S. PATENT DOCUMENTS

| | | | |
|---|---|---|---|
| 6,574,629 | B1 | 6/2003 | Cooke, Jr. et al. |
| 7,411,693 | B2 | 8/2008 | Loukipoudis et al. |
| 2002/0026329 | A1* | 2/2002 | Saito et al. .................. 705/3 |
| 2003/0012170 | A1 | 1/2003 | Vassilovski et al. |
| 2003/0065740 | A1* | 4/2003 | Allen ............................ 709/217 |
| 2003/0074248 | A1* | 4/2003 | Braud et al. ..................... 705/9 |
| 2003/0088438 | A1* | 5/2003 | Maughan et al. ................. 705/2 |
| 2003/0130786 | A1* | 7/2003 | Ilkin et al. ..................... 701/205 |
| 2004/0042672 | A1* | 3/2004 | Nozu ............................ 382/233 |
| 2004/0054744 | A1 | 3/2004 | Karamchedu et al. |
| 2004/0167804 | A1* | 8/2004 | Simpson et al. .................. 705/3 |
| 2004/0208133 | A1* | 10/2004 | Jay et al. ..................... 370/252 |
| 2004/0210458 | A1* | 10/2004 | Evans et al. .................... 705/2 |
| 2005/0043968 | A1* | 2/2005 | Sauerwald ....................... 705/2 |
| 2005/0117580 | A1 | 6/2005 | del Val et al. |
| 2005/0135399 | A1* | 6/2005 | Baden et al. .................. 370/428 |
| 2005/0152286 | A1 | 7/2005 | Betts et al. |
| 2005/0203771 | A1 | 9/2005 | Achan |
| 2005/0209885 | A1* | 9/2005 | Lamb et al. ..................... 705/2 |
| 2006/0007466 | A1* | 1/2006 | Ben-Yehuda et al. ....... 358/1.13 |
| 2006/0165104 | A1 | 7/2006 | Kaye |

OTHER PUBLICATIONS

Carzaniga, et al., "Content-Based Addressing and Routing: A General Model and It's Application," Department of Computer Science, University of Colorado, pp. 1-15, 2000.

Supplementary European Search Report for European Patent Application 06825047.1. European Patent Office, May 18, 2010.

Examiner's First Report on Australian Patent Application 2006294986. Australian Intellectual Property Office, Mar. 9, 2010.

International Preliminary Report on Patentability, International Application PCT/US06/36772. International Bureau of WIPO, Mar. 26, 2008.

International Search Report, International Application PCT/US06/36772. International Search Authority/USPTO, Oct. 12, 2007.

European Examination Report for European Patent Application 06825047.1. European Patent Office, May 31, 2010.

* cited by examiner

AUTONOMOUS ROUTING OF NETWORK MESSAGES

CROSS REFERENCE TO RELATED APPLICATIONS

This application is a continuation of prior application Ser. No. 11/233,775, filed Sep. 22, 2005 now U.S. Pat. No. 7,630,371.

This application is related to co-pending U.S. Patent Application entitled "Event Notification Verification And Escalation", U.S. Patent Application entitled "Method and Apparatus for Adjustable Image Compression", and U.S. Patent Application entitled "Method And Apparatus For Boundary-Based Image Compression", all of which are being filed concurrently with the present application and are hereby incorporated by reference.

BACKGROUND OF THE INVENTION

1. Field of the Invention

This invention relates generally to processing of electronic messages over computer networks and, more particularly, to automatic routing of such messages over such networks.

2. Description of the Related Art

Message handling is an important function that must be carefully and efficiently performed. For example, a health care delivery system such as a hospital or medical center will receive messages of many different types. It is critical for the health of patients that messages are delivered to appropriate medical staff, with no loss of information. Currently, a hospital network is likely to include different message handling resources for the different types of messages the hospital might receive. For example, a telephone message handling system might attend to telephone messages received by the hospital. An email system might be in place to handle electronic messaging, utilizing email software to ensure message delivery. Finally, a database system with data network might provide for data distribution, storage, and access among the different offices or laboratories of the hospital.

Although the important message formats can be handled by the combination of message handling resources, the multiplicity of systems for handling the message types leads to inefficient operation and increased possibility of errors.

Modern hospitals are likely to encounter a great variety of message formats. In addition to telephone messages, email messages, and conventional database documents, a hospital is likely to receive messages according to the well-known HL7 format. The HL7 format is a specification for messages that are likely to find greatest application in the hospital setting, and specifies medical task codes and the like for medical procedures. Another data format in widespread use is the DICOM (Digital Imaging and Communications in Medicine) format. The DICOM format is mandated in many medical systems, and is used to specify data formats used in medical procedures with imagery, with special attention to patient identification and other data fields important to health care insurance providers. The DICOM format specifies a header (with patient data and image information) as well as the image data. Thus, a DICOM file is an example of a compound file format having text data and image information. In addition to compound file format files such as DICOM, the database might include image information in a variety of single-type data formats, such as JPEG data, bitmap data, TIFF images, and the like.

It would be advantageous if a single message handling system could support messaging in a variety of message formats, with efficient message handling to ensure message arrival at appropriate destinations.

From the discussion above, it should be apparent that there is a need for a system that can provide versatile, reliable message handling for network messages. The present invention fulfills this need. Other problems with the prior art not described above can also be overcome using the teachings of the present invention, as would be readily apparent to one of ordinary skill in the art after reading this disclosure.

SUMMARY

In accordance with the invention, messages from a network are processed so that each received message is received in one of a plurality of message formats, the content of each message is determined, and a network destination to which the message will be directed is selected, based on the determined message content. In one aspect, selecting a network destination comprises parsing the message to determine values for a set of message fields comprising parameters that characterize the message and applying a set of conditional rules that specify the selected destination in accordance with the message field values. If the parsed message fields do not indicate a network destination, then the destination can be automatically selected, in accordance with message content. In another aspect, the content of the message can be transformed. The message transformation can encompass a variety of format changes. In yet another aspect, it can be determined if the message has been received for greater than a predetermined time limit without being directed to a selected destination and, if so, a notification action can be performed if the predetermined time limit has been exceeded. Another aspect is that it can be determined if follow up action is required for the message and, if so, a check for whether the follow up action occurs can be scheduled. If desired, a notification message can be generated if a time limit occurs without occurrence of the follow up action. Once content of the message is determined, if image data is detected in the message, then image analysis on the image data can be performed to detect message content that is used in selecting a destination.

Other features and advantages of the present invention should be apparent from the following description of the preferred embodiment, which illustrates, by way of example, the principles of the invention.

DETAILED DESCRIPTION

Figure 1:
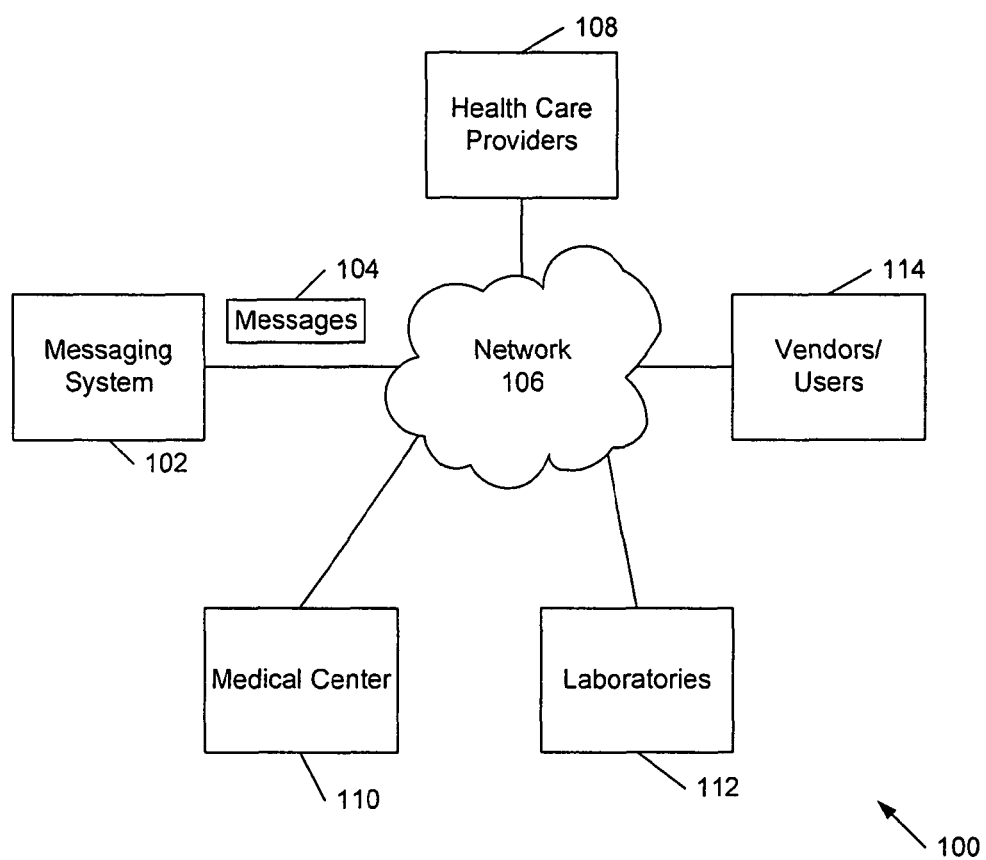
FIG. 1 is a block diagram that shows a message handling system constructed in accordance with the invention in communication over a network.

FIG. 1 is a block diagram representation of a messaging network data processing environment 100 in which a messaging system 102 receives messages 104 over a computer network 106 for processing. Communications over the network can occur, for example, according to transport mechanisms such as TCP/IP, or can be received according to network-specific protocols. The messages can be in any one of a plurality of message formats, such as email messages, data transmissions, voice messages, Web pages, and the like. The messaging system 102 can receive messages that originate from any network-communicating source. In the FIG. 1 illustrated embodiment, the message sources comprise health care providers 108 such as individual physicians and other allied providers, medical centers 110 such as hospitals and patient care or managed care facilities, laboratories 112 such as medical labs and diagnostic centers, and vendors and users 114, including individual patients, administration services such as management and insurance providers, and other network users who need to communicate with one of the other network users 108, 110, 112, 114 through the messaging system 102. The network 106 can comprise a local area network (LAN) that interconnects the network nodes 102, 108, 110, 112, 114. The network 106 can include communications over the Internet, or over a combination of local and wide area networks relative to the messaging system 102, including intranets and extranets.

In accordance with an embodiment of the invention, a message 104 is received over the network 106 in one of a plurality of message formats, the message content is determined by the messaging system 102, and a network destination to which the message will be directed is selected, based on the determined message content. The message formats can include, for example, email messages, image (graphics) data, voice messages, alphanumeric data including formatted documents and text files, and any other type of digitally encoded data that can be transferred over the network 106 to the messaging system 102. As used in this description, a "message" can include requests for information, answers or responses to requests, data updates, and other data traffic that is routed over the network 106. As described more fully below, selection of the message destination is performed according to a set of rules that permit quick, efficient, automatic determination of message destination, based on the message content. If a message 104 is received at the messaging system 102 with no indicated recipient, the system can examine the message content and determine an appropriate destination, to which the message will then be routed by the system.

An exemplary depiction of message structure for the illustrated system is provided below:

| Message ID header | sending node (address) | destination node (address) | message hierarchy fields | message text | message attachment or payload |
|---|---|---|---|---|---|

The various fields of the message data include a message ID header, a sending node address, a destination node address (which may be blank), message hierarchy fields (described further below), message text, and message attachment or payload (such as image data). It should be understood that the message structure depicted above is exemplary only and is for purposes of illustrating the embodiments described herein. Other message structures, with additional or different fields, may also be suitable.

Figure 2:
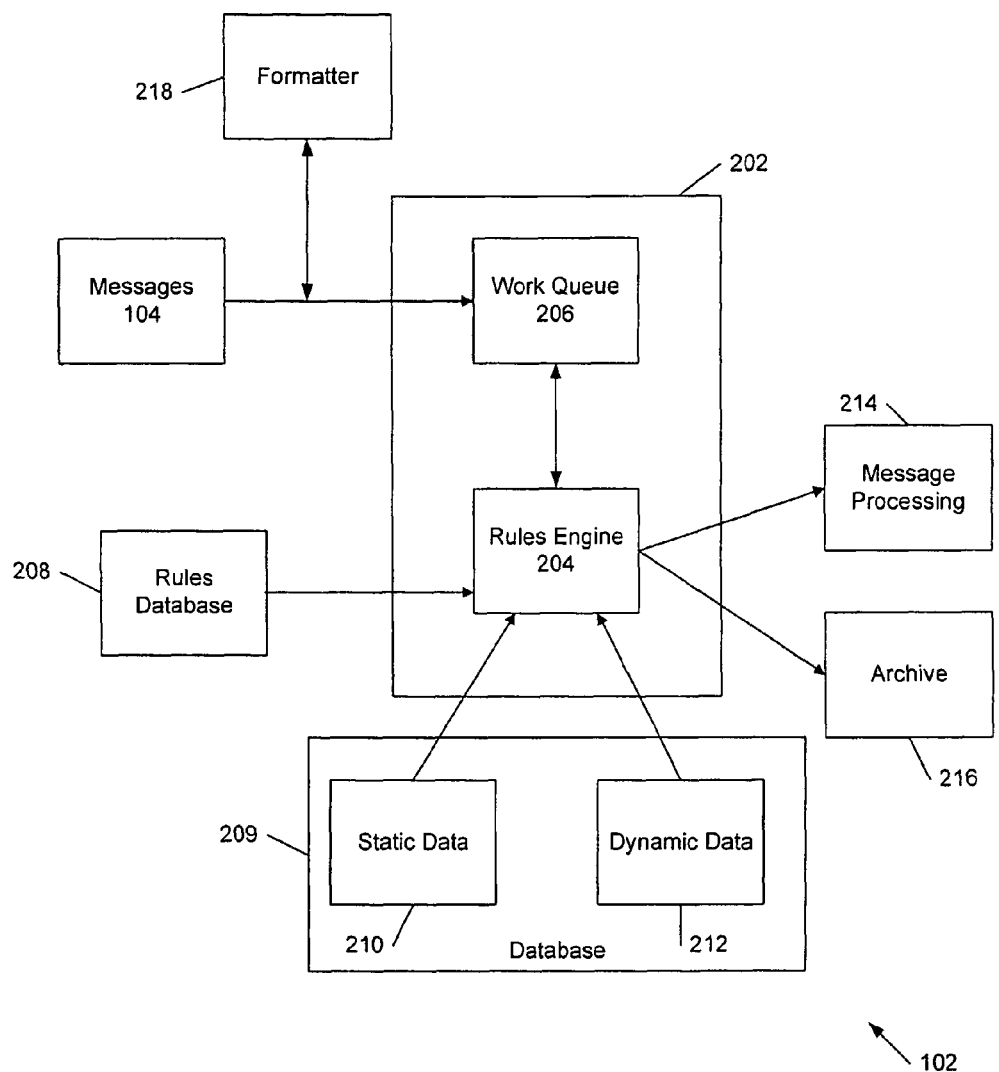
FIG. 2 is a block diagram that shows the components of the FIG. 1 message handling system.

FIG. 2 is a block diagram that shows components of the messaging system 102 of FIG. 1. FIG. 2 shows that the messaging system 102 includes a message processor 202 with a rules engine 204 and a work queue 206. Messages 104 are received at the work queue and are processed by the rules engine. To determine the routing destination, the rules engine receives rules from a rules database 208. The rules engine 204 also relies on information from a database 209 that includes static and dynamic information and can be suitably partitioned into a static data database 210 and a dynamic data database 212. Dynamic information is regarded as information that relates to particular messages or current system operating states or conditions. Static information is defined to be information not related to messages, such as patient data or medical staff data. Once the rules engine determines the message destination or other disposition, the rules engine may cause the message to be delivered to the selected network destination via a message processing unit 214 and may additionally, or alternatively, cause the message to be delivered to an archive database 216 for storage and later retrieval. As described further below, the rules engine can direct a broad variety of message processing tasks, including data compression, message synthesis (creation of new documents), notification, forwarding, storage, and transformation. The system 102 also includes a message formatter 218, which can process messages so as to reformat them from one format to another. For example, a suitable formatter 218 could change an image message that includes JPEG images into a message that includes images in PDF format or TIFF format or the like.

The static data 210 used by the rules engine 204 includes information such as data relating to physicians who might be the source, destination, or subject of messages, network locations of facilities or entities for communication of messages, and other contact information for message sources and recipients or destinations. Other static parameters may relate to network resource parameters or configuration data, or other data that does not change or that changes infrequently. The dynamic data 212 generally includes information about the system 100, such as available network resources, bandwidth, condition of the network, message identification data, date and time information, and other system information that typically changes repeatedly during system operation.

The rules database 208 contains a collection of message processing rules, including rules that are message-dependent for the message being processed and rules that do not depend on any characteristics of the message. The rules are generally specified in an "if-then" format. As well as Boolean "or" and "not". For example, a rule might be specified as "if message expiration time has passed, then delete this message from work queue." The system 102 will preferably operate on message properties and information in the database 209. For example, most implementations of the system will likely define message properties in terms of sender identity, recipient identity, subject field, type of message, time of sending, time of receipt, expiration time, and the like. Most implementations will include information in the database such as current clock time and date, message queue length in number of messages, medical personnel data, patient data, sending location data, and the like. It should be noted that the database 209 includes information that is independent of any particular message, such as information related to the system, to the patient population, and to the medical staff and facilities. As described further below, if a message is received with one or more message properties left undefined, then the system can supply a default value or can otherwise determine a suitable value for the missing field, as needed for routing the message.

Information related to patients and messages is described in greater detail below. Information about physicians and resources (personnel and facilities) who are part of the system 102 can include physician name, network address (destination for message routing purposes) and title, date of registry with the system, date of last access, username, password for system access, status as destination (active/not active), name and address of associated institution (e.g. hospital affiliation), credentials as to specialization, accreditation, insurance coverage, and the like, areas of expertise or experience, current availability (scheduling, unavailable time periods with start and end times), and preferred message formats including preferred message format, such as attached images in uncompressed bitmap data or TIFF data or JPEG data, or compressed formats, and the like. If no preferred message format is indicated for a physician or resource, then image attachments to messages are kept in their native (original) format.

To determine how a message should be handled and to select a message destination if one is not specified, the rules engine 204 parses the message according to a set of message fields whose field values will characterize the message. The message fields can include system parameters, such as available network bandwidth, current message queue size, quality of service, network resource availability, and the like. The message fields can include message parameters, such as message format (e.g., image data, email data, DICOM, or alphanumeric data), message length, urgency indicator, message source, identified recipient (if applicable). Additional parameters may be used for the message fields.

If the parsed message fields do not indicate a network destination, that is, one of the parsed fields does not correspond to a message recipient, then the destination can be automatically selected. Automatic selection can occur in response to message content, such as content that is derived from the parsed message fields, and also from content of the message payload. Selection of a destination also can be based on static information, such as medical personnel, patient data, and the like, to identify a patient's physician or treating specialist, or to identify medical staff with appropriate expertise to receive the message and act on it. In addition, various databases internal to the system 102 and external to the system (but accessible via the network 106) can be consulted and information can be retrieved to determine data necessary for routing the message to the appropriate destinations.

The rules database 208 specifies rules in a programming language that, for greater efficiency, is preferably a language that is interpreted or is a scripting language. This enables rules to be easily added to the rules database and evaluated for proper syntax and definition, and dynamically applied to incoming messages as the messages are processed by the system. Examples of suitable language specifications for the rules include the "Python" and "Perl" and "Java" programming languages. Other languages or rule formats can be used, so long as the system 102 is able to check each incoming message against conditional operations specified by rules in the rules database 208. The rules are preferably specified according to a pseudocode phrasing or Boolean string that will be recognized by a rules processor for the database. The rules can be inserted directly into the rules database using programming techniques and editors or can be produced through a user interface that is supplied with the system so as to be automatically inserted into the rules database in the proper format. Rules for the database can be built by system administrators and by end users, either using automatic interfaces such as "wizards" or using suitable text editors with or without templates, and building from a core set of generic rules and exemplary rules logic.

As noted above, rules are generally specified in a boolean "if . . . then . . . " format. Examples of such rules include rules that operate on the message type. For example, message types might include requests for scheduling resources, deliveries of reports, queries for available staff, or system announcements.

An example of a resource request message is one that seeks to reserve a hospital operating room. A rule that operates according to message type might specify "if message type is a resource request, then send the message to a resource scheduling computer." Other message rules can be specified to operate according to other message properties, such as sender identity, recipient identity, subject field, type of message, time of sending, time of receipt, expiration time, and so forth, as desired. For example, "if the message subject field is an x-ray report, then send a copy to the radiology department."

Another type of rule for the database 208 is one that operates on dynamic system properties. For example, the system maintains data that describes system parameters, such as the quantity and type of message queues and the number of messages in each message queue, waiting to be sent over the network. One rule could be to not send any message from a particular message queue until there are at least a specified number of messages in that queue. Another rule can be a rule that operates on dynamic data such as for scheduling. For example, if it is known that a staff physician will be absent on a particular day and that another staff physician will assume the absent physician's responsibilities for that day, then the rule might state "If the message recipient is Doctor Adams and the message date is June 1, then forward the message to Doctor Baker." Another message rule might be "If the message received time is past 12:00 noon and the message date is June 1 and the message recipient is Doctor Adams, then forward the message to Doctor Baker, else send the message to Doctor Adams." Messages also can be processed according to resource capacity. For example, each medical specialist or reviewing physician who is available to system users can be entered into a system database 209 and a count of studies and reports corresponding to the available specialist or reviewer can be kept. A message rule can specify a situation, such as "If the count of uncompleted studies for this reviewing physician is greater than five, then select a new reviewing doctor from the group of reviewing physicians with counts less than three" or a rule might be "If the count of uncompleted studies for this reviewing physician is greater than five, then select a new reviewing doctor from the group of available reviewing physicians with the lowest count of uncompleted studies."

The rule processing of the system 102 is suitable for handling scheduling of personnel and resources. The system databases can be loaded with scheduling information, which can be published to suitable system users, and the system can request notification of any schedule changes. The notification request helps ensure that the scheduling information is current. The system will increment a count of uncompleted studies for a reviewing physician when that physician is sent a study for review. When that physician posts a report to the system, providing an evaluation of a study, then that study is marked as complete and that physician's study count is decremented. The system also sends a message to the referring physician (the physician who requested the study) to notify the requesting physician that the report on the study is published to the network and is available for viewing by the requesting physician.

In addition, a message can be handled according to a message priority rule. If desired, one or more of the rules in the rules database 208 can operate to determine a message priority, if the message itself does not indicate an assigned priority. In such a case, the message priority can be computed from static and dynamic data associated with the message and system. For example, a message priority can be computed from the message received time, the message recipient, the message sender, message subject, message queue length, and so forth. An example of such a rule would be "If the message recipient is the Emergency Room and if the message subject is 'incoming patient', then set priority to 'high' and forward the message to all Emergency Services department staff computers."

In general, a message is processed by evaluating message properties against the rules database. If all operands for a rule are in one of the system databases, then the message rule can be processed (evaluated). If data from external sources must be checked before a rule can be processed, then the message handling is suspended until an action occurs. The requisite action typically involves retrieving the information from an external data source. The requisite action might comprise, for example, retrieving physician availability information from an external medical clinic staff database. After the information has been retrieved, the rule can be evaluated. Thus, it is more efficient for system message processing if external data sources would push their information into databases of the system. Therefore, it is desirable if data from external sources that corresponds to message properties and system configuration data that are used in rules evaluation were pushed to the system.

Other examples of message processing rules include rules based on scheduling constraints, such as physician availability or operability of laboratories or clinics. Other rules can be oriented toward anatomy rules, so that messages that involve particular anatomical areas are routed or copied to appropriate departments or records areas. Another message handling determinant can be patient insurance information, such as type of coverage. For example, in the U.S., for payment of services by some government programs such as Medicare, the treating physician must be a resident of the same state or territory as the patient. Appropriate message handling rules can ensure that treatment through the system 102 is provided in compliance with this restriction, thereby ensuring suitable government reimbursement. Other message rules can check for time of day restrictions, to ensure that messages are not sent to locations for handling or response where the destination location is in a geographical location (i.e. time zone) that would prevent a timely response for the patient.

Preferably, the message rules database 208 can specify notification parameters. For example, if a message "sent time" is after business hours (e.g., 6:00 PM), then a message rule can be specified to automatically generate a notification to the message sender that the intended destination is closed, and can also indicate to the message sender that the system is forwarding the message to a newly generated destination that can process the message in a timely manner to return a response before the intended destination is next open for business and available for processing the message.

In the illustrated embodiment, the message fields include a set of message hierarchy fields. The message hierarchy fields more precisely specify a particular message. The messages processed by the FIG. 1 system are characterized by a hierarchy comprising:

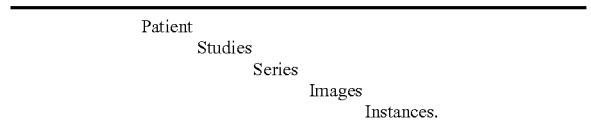

The indentation levels above are intended to correspond to the levels of the message hierarchy. The rules engine can decide on a routing according to the value in any field of the message hierarchy.

The "Patient" level identifies an individual with whom the message is associated. For example, the message may contain data relating to the medical condition of the patient who is identified by the field value in the "Patient" field of the message hierarchy. The "Studies" field typically pertains to a particular patient related subject, such as an office visit by the patient, an examination, ailment, occurrence, or body region of interest. The "Series" field typically relates to images that were acquired or obtained at the same time or during a particular examination event. An image series is typically requested by a medical specialist for a particular study and will specify an axis of viewing (front series of images, side series, top, etc.). The "Images" field identifies particular images in a series. The "Instances" field relates to multiple versions or transformed images for a patient. For example, every image for a particular patient has an "Image" identifier for the image, but each image will have associated with it a particular table of Instance values. Thus, if an image is compressed, then the compressed version of the image will have a new instance number. The original image and the compressed image will have the same "Images" field, but will have different "Instance" field values. The images will likely also have the same "Studies" and "Series" field values.

The message fields also can include content parameters. That is, the message fields over which the rules engine 204 will parse can include parameters related to the message itself, such as identifying a message as a "report message" that should be reviewed by a recipient and can be expected to result in a response message. The content parameter of the message fields may indicate an image message that prompts an analysis action, or may indicate an image message that prompts an archive action, or may indicate a response message that is associated with a request message.

It might be that a message is received with field values that are not sufficient for the rules engine 204 to determine message handling. In such a circumstance, the rules engine will automatically provide additional field values for the message to provide a complete set of message field values, such as default values, and will then apply the set of rules to the completed message field values for selecting a destination or take other message handling action.

The rules engine 204 is preferably implemented on a digital computer that can receive data, process it, and communicate over the network. In that regard, the rules engine includes memory or other available storage to provide data tables in which the message field values are stored. The other components 208 through 218 illustrated in FIG. 2 can be implemented in a similar fashion, as software processes executing on digital computers or other data processing devices. Alternatively, all the processing components shown in FIG. 2 can be integrated into a single processing machine, or can be implemented across one or many computer platforms, as desired.

Figure 3:
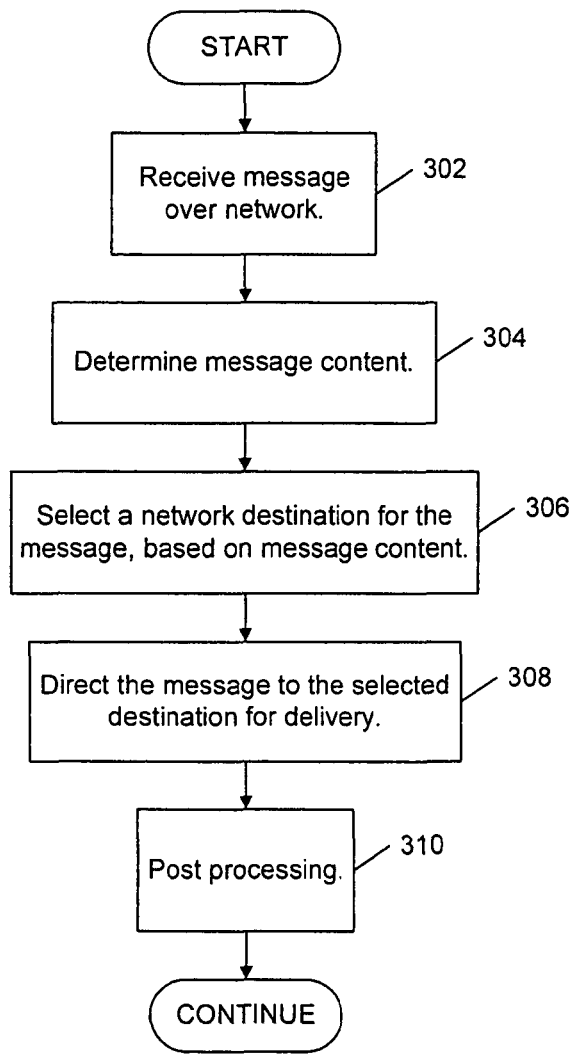
FIG. 3 is a flow diagram of message handling performed by the system illustrated in FIG. 1.

The data processing operations carried out by the FIG. 2 system is illustrated in the flowchart of FIG. 3. In the first operation, indicated by the flow diagram box numbered 302, a message is received over the network. In the next operation 304, the message content is determined. As noted above, the message content could be email, image data, voice message, alphanumeric data, documents, or any one of a variety of data formats, or combinations thereof.

In the next operation, represented by the flow diagram box numbered 306, a network destination is selected, based on the message content. Thus, the message might be received with no indicated destination. In accordance with the rules engine operation, the system will select a destination that is appropriate for the message content. For example, if the message is a radiographic study, and no intended recipient is identified, the system can utilize the message handling rules to identify the most appropriate radiologist or other specialist to whom the message should be directed for review. The next operation 308 directs the message to the selected destination for delivery. Finally, the system can direct post processing operations 310. For example, if the message is a radiographic study that was sent to a radiologist, then the system can be configured for post message processing 310 that will automatically schedule a check to see that a response message or report is provided within a predetermined time interval or deadline for the analysis. The system operation then continues with other tasks.

Figure 4:
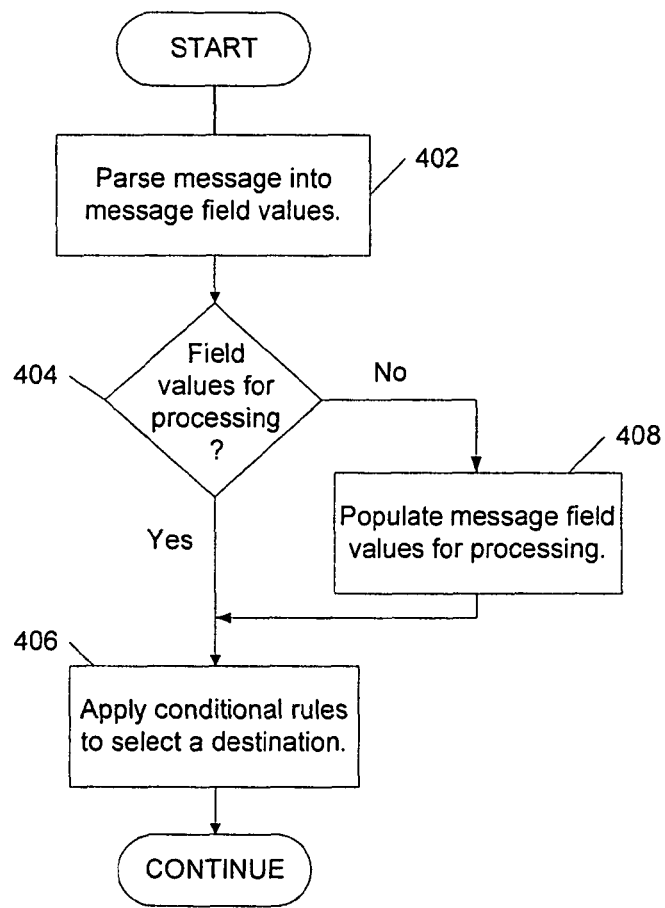
FIG. 4 is a flow diagram that shows operations performed for the message destination selection of FIG. 3.

Operations for selecting the message destination are illustrated in the FIG. 4 flowchart. Destination selection begins at the flow chart box numbered 402 with message parsing across the message field values as described above. Next, the rules engine determines if sufficient field values are present to enable it to carry out its processing. This determination is represented by the decision box numbered 404. If there is sufficient message field information, an affirmative outcome at the decision box 404, then processing proceeds to apply the rules to select a destination in accordance with the field values present at the box 406. If insufficient message field values are present to permit destination selection, a negative outcome at the decision box 404, then the filed values of the message are populated with alternate or default values (indicated at the box 408) that will enable the rules engine to proceed with the destination selection operations at the box 406.

Figure 5:
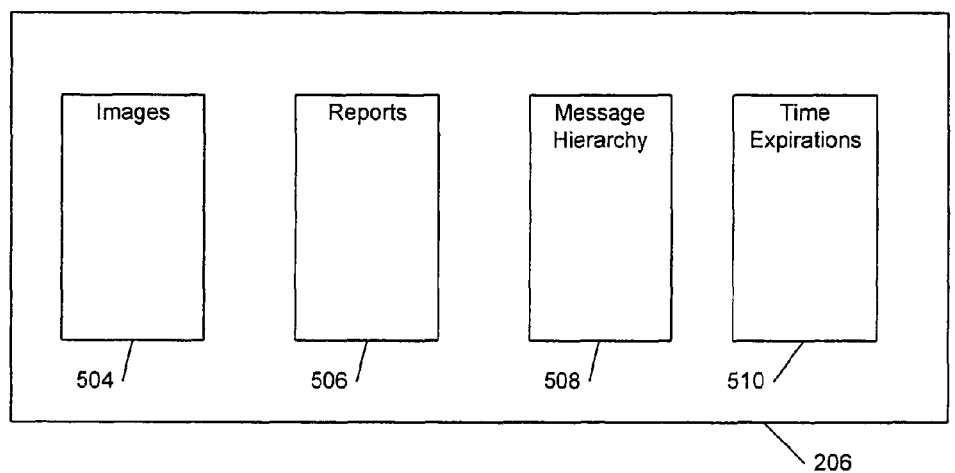
FIG. 5 is a representation of the work queue data tables maintained by the messaging system of FIG. 1.

FIG. 5 is a representation of the data tables maintained by the rules engine in the work queue 206 for the message field values. FIG. 5 shows that the field values include specification of images 504, reports 506, message hierarchy 508, and time expirations 510. It should be understood that the tables shown in FIG. 5 are for purposes of illustration only, if desired, additional field values can be provided, in accordance with the processing needs and capabilities of the system 100.

If desired, the system 100 can perform message reformatting, or transformation, on the content of a message. As noted above, a message formatter 218 can be provided in the messaging system 102 to reformat messages from one format to another. This is convenient, for example, where messages are received in accordance with the DICOM specification and must be processed by a system not otherwise equipped to handle the message. The formatter 218 can take care of formatting to and from the DICOM specification. The properly formatted message can then be received into the work queue and can be processed by the rules engine.

If desired, the formatter 218 also can be used to accommodate a network destination (or receive from a source) that might not be able to process message content of one format, but has the ability to process the message if in a different format. An exemplary situation would be where an image-based message includes JPEG2000 formatted images, which a selected destination cannot process. The formatter 218 can then transform the JPEG2000 formatted images into a format that can be processed by the selected destination, such as, for example, TIFF or GIF or the like. Thus, the formatter can process messages that contain image data, and can transform the content from one image data format to a changed image data format. A similar transformation operation might relate to audio files, or voice files, or the like.

In another alternative, the formatter, for efficiency reasons, can transform the content by performing data compression on the message content. In addition, the formatter can transform the content by creating a new data document for transmission over the network. This is performed, for example, where the format of the original message is preserved, and the transformed message comprises a second message that is the transformation of the original message, wherein the new data document is created in response to detecting that a capability of the selected destination to handle the message format is lacking, so that the new data document has a message format that can be handled by the selected destination.

Transformation can also comprise initiating an action that is dependent on the message being processed. For example, transforming can comprise initiating a notification action, such as generating a message that informs a recipient that a message has expired or that a response is overdue. In addition, transforming the content can comprise a data storage action, such as storing an image series into an archive (see FIG. 2). Transforming also could comprise a message forwarding action. The rules engine, for example, could enforce automatic forwarding of particular message types (see message fields discussion above) through the formatter. Transformation also can comprise performing data compression on the message content.

Figure 6:
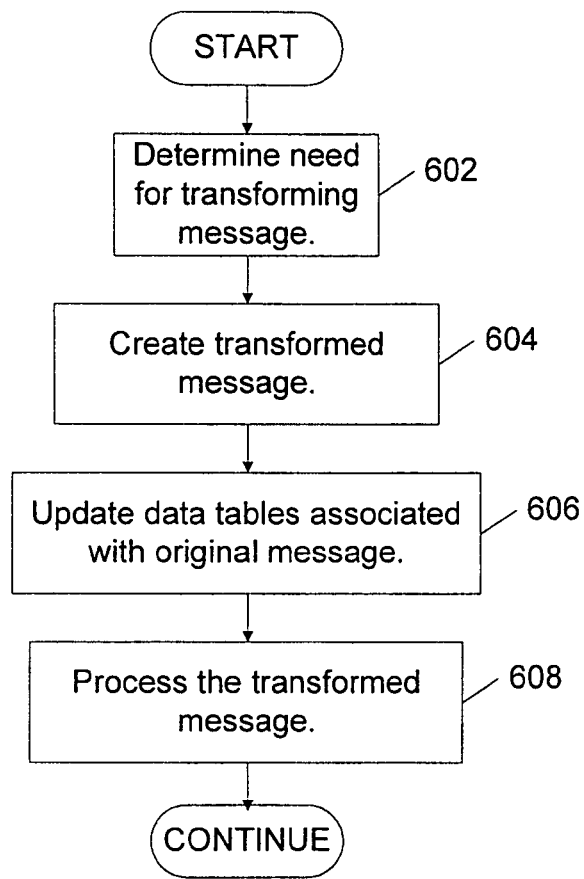
FIG. 6 is a flow diagram that shows optional message transformation operations performed by the messaging system of FIG. 1.

The message transformation of the system 102 is illustrated in FIG. 6, which illustrates the sequence of transformation operations. In the first operation 602, the need for a transformation is determined. For example, the system might determine from resource parameters in the static database 210, that a selected destination cannot handle a particular data format. In response, the system will create a transformed message at 604. Next, the system will update data tables associated with the original message. These are message data tables 206 such as illustrated in FIG. 5. Lastly, the system processes the transformed message at 608. This action may comprise sending the transformed or created message to a selected destination.

Another optional feature of the system 102 is to provide for image analysis of messages. Such operations can be performed as part of the message content determination 304 (see FIG. 3). The image analysis may be performed by the message processor 202 or by another processing device of the system 102 (see FIG. 2) prior to selecting a message destination. The system first detects that the message content includes image data. The system then performs image analysis (or directs that image analysis is performed) to detect message content that is used in selecting a destination. For example, the image analysis might detect that the image shows a patient's bone break, or indicates the presence of a particular ailment. In response, the system can select an appropriate specialist or vendor (see FIG. 2) as the destination.

As described above, the operations in accordance with the invention can be quickly and efficiently performed by computers that are in communication with the network (see FIG. 1). The operations can be carried out by multiple computers that share the tasks described above, or the tasks can be performed by a single computer having sufficient resources for the tasks required. A single computer that performs most or all of the message handling tasks (such as the operations of the message processor 202) may commonly be referred to as a server (that is, it will have processing capabilities commensurate with a server). The operations can be performed by the computers as a result of executing installed software programs comprising computer instructions, in conjunction with user input. An example of a suitable computer for performing the operations described above is illustrated in FIG. 7 and is described below.

Figure 7:
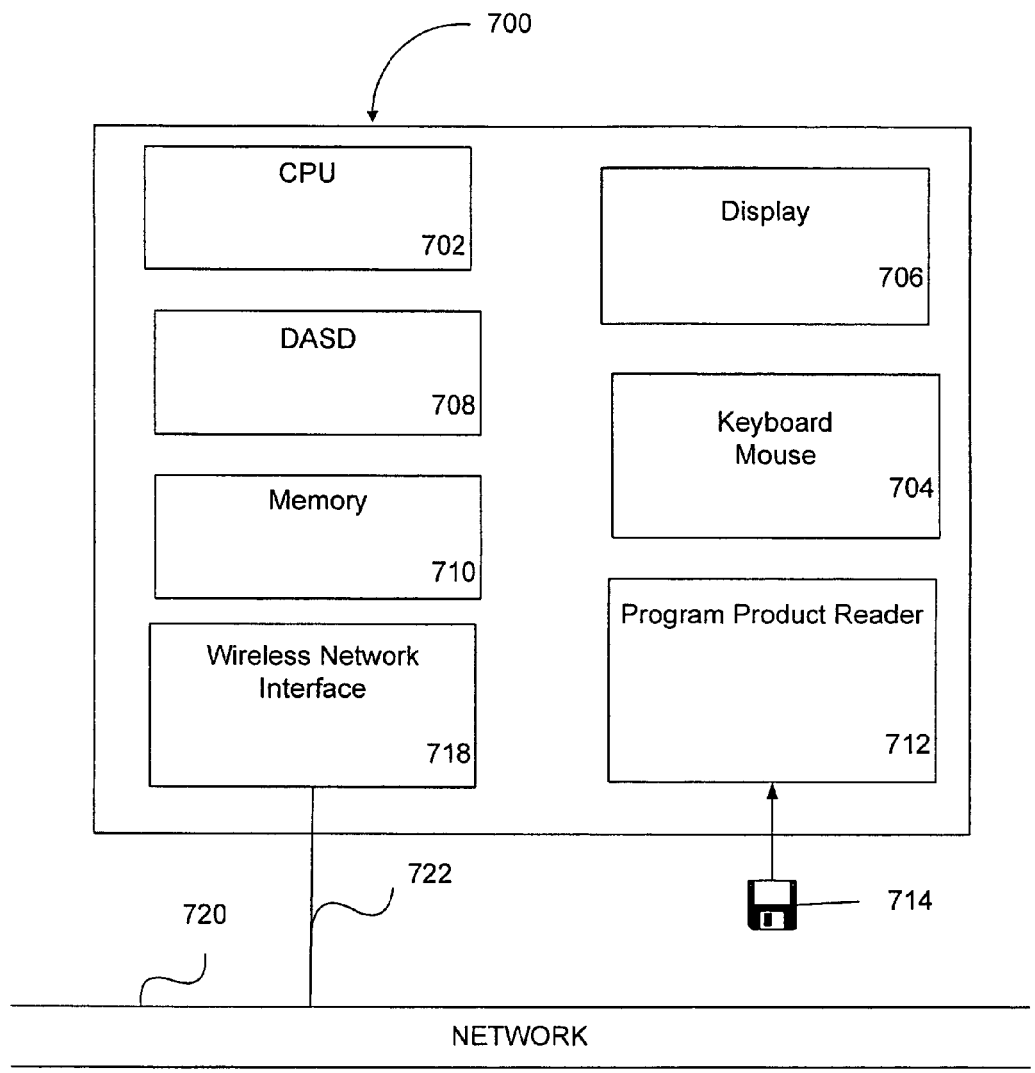
FIG. 7 is a block diagram that illustrates the construction of a computer that performs the operations of the message handling system.

FIG. 7 shows an exemplary computer 700 such as might comprise a computer for executing the operations described above. The computer 700 operates in a networked environment that permits communication with other computers. The computer 700 operates under control of a central processor unit (CPU) 702, such as a "Pentium" microprocessor and associated integrated circuit chips, available from Intel Corporation of Santa Clara, Calif., USA. A computer user can input commands and data from a keyboard and computer mouse 704, and can view inputs and computer output at a display 706. The display is typically a video monitor or flat panel display. The computer 700 also typically includes a direct access storage device (DASD) 708, such as a hard disk drive. A memory 710 typically comprises volatile semiconductor random access memory (RAM). Each computer preferably includes a program product reader 712 that accepts a program product storage device 714, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

The computer 700 can communicate with any other computers, if networked, over a computer network 720 (such as the Internet or an intranet) through a network interface 718 that enables communication over a connection 722 between the network 720 and the computer. The network interface 718 typically comprises, for example, a Network Interface Card (NIC) or a modem that permits communications over a variety of networks.

The CPU 702 operates under control of programming instructions that are temporarily stored in the memory 710 of the computer 700. When the programming instructions are executed, the computer performs its functions. Thus, the programming steps implement the functionality of the system described above. The programming steps can be received from the DASD 708, through the program product storage device 714, or through the network connection 722. The program product storage drive 712 can receive a program product 714, read programming steps recorded thereon, and transfer the programming steps into the memory 710 for execution by the CPU 702. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 710 over the network 720. In the network method, the computer receives data including program steps into the memory 710 through the network interface 718 after network communication has been established over the network connection 722 by well-known methods that will be understood by those skilled in the art without further explanation. The program steps are then executed by the CPU 702 thereby comprising a computer process.

Thus, the invention provides techniques for autonomous routing of network messages. The techniques, applicable in a variety of message systems, improves the efficiency and appropriateness of message handling.

The present invention has been described above in terms of a presently preferred embodiment so that an understanding of the present invention can be conveyed. There are, however, many configurations for network message processing not specifically described herein but with which the present invention is applicable. The present invention should therefore not be seen as limited to the particular embodiments described herein, but rather, it should be understood that the present invention has wide applicability with respect to network message processing generally. All modifications, variations, or equivalent arrangements and implementations that are within the scope of the attached claims should therefore be considered within the scope of the invention.

We claim:

1. A method of processing messages in a healthcare communication network, the method comprising:
    receiving a message within a healthcare communication network in a HL7 format;
    parsing the received message to determine values for a set of message fields comprising parameters that characterize the received message;
    determining a content payload of the received message;
    applying a set of conditional rules to the message field values and determined content payload to determine a healthcare communication network destination to which the received message should be directed, wherein applying the set of conditional rules to the message field values comprises:
        determining whether the received message contains a sufficient set of message field values to allow the network destination to be determined through the application of the set of conditional rules; and
        in response to determining that the received message does not contain a sufficient set of message field values to allow the network destination to be determined:
            populating any deficient message field values with default values; and
            applying the set of conditional rules to a complete set of message field values, wherein the complete set comprises the received message field values and the default values; and
    directing the received message to the determined healthcare communication network destination.

2. A method as defined in claim 1, wherein the message fields include system parameters of the network.

3. A method as defined in claim 2, wherein the system parameters include network bandwidth.

4. A method as defined in claim 2, wherein the system parameters include received message queue size.

5. A method as defined in claim 2, wherein the system parameters include network resource availability.

6. A method as defined in claim 1, wherein the message fields include a plurality of received message format parameters.

7. A method as defined in claim 6, wherein the received message format parameters include a message format of image data.

8. A method as defined in claim 6, wherein the received message format parameters include a message format of email data.

9. A method as defined in claim 6, wherein the received message format parameters include a message format of alphanumeric data.

10. A method as defined in claim 1, wherein the message fields include a set of message hierarchy fields.

11. A method as defined in claim 10, wherein the message hierarchy fields include Patient, Study, Series, Image, and Instance identification fields.

12. A method as defined in claim 1, wherein the message fields include a plurality of message content parameters.

13. A method as defined in claim 12, wherein the message content parameters include a report message that prompts a response message.

14. A method as defined in claim 12, wherein the message content parameters include an image message that prompts an analysis action.

15. A method as defined in claim 12, wherein the message content parameters include an image message that prompts an archive action.

16. A method as defined in claim 12, wherein the message content parameters include a response message that is associated with a request message.

17. A method as defined in claim 1, wherein parsing the received message comprises populating a plurality of data tables for the received message according to the message field values.

18. A method as defined in claim 1, further comprising transforming the content of the received message.

19. A method as defined in claim 18, wherein the received message content comprises image data, and transforming the content comprises changing a format of the image data to a changed image data format.

20. A method as defined in claim 18, wherein transforming the content comprises performing data compression on the received message content.

21. A method as defined in claim 18, wherein transforming the content comprises creating a new data document for transmission over the network.

22. A method as defined in claim 21, wherein the new data document is created in response to detecting that a capability of the determined destination to handle the message format is lacking, and wherein the new data document has a message format that can be handled by the determined destination.

23. A method as defined in claim 18, wherein transforming the content comprises a notification action.

24. A method as defined in claim 18, wherein transforming the content comprises a data storage action.

25. A method as defined in claim 18, wherein transforming the content comprises a message forwarding action.

26. A method as defined in claim 18, wherein transforming the content comprises performing data compression on the message content.

27. A method as defined in claim 18, wherein the message comprises image data that is associated with an instance identifier, and transforming the content comprises changing a data format of the image data and assigning a changed instance identifier to the changed image data format.

28. A method as defined in claim 27, wherein the changed image data format comprises data in compliance with a compound file format.

29. A method as defined in claim 27, wherein the changed image data format comprises data in compliance with a single type format.

30. A method as defined in claim 29, wherein the single type format is either JPEG, JPEG2000, or raw raster format.

31. A method as defined in claim 1, further comprising:
determining if the message has been received for greater than a predetermined time limit without being directed to the determined destination;
performing a notification action if the predetermined time limit has been exceeded.

32. A method as defined in claim 1, further comprising:
determining if follow up action is required for the message; and
scheduling a check for whether the follow up action occurs.

33. A method as defined in claim 32, further comprising generating a notification message if a time limit occurs without occurrence of the follow up action.

34. A method as defined in claim 1, wherein determining content comprises:
detecting image data in the received message; and
performing image analysis on the image data to detect the message content payload to which the set of conditional rules is applied to determine the healthcare communication network destination.

35. The method of claim 1, wherein applying a set of conditional rules to the message field values and determined content payload to determine a healthcare communication network destination to which the received message should be directed comprises:
identifying via the application of the rules a suitable alternative recipient when a primary recipient who is directly identified in said message is not available to receive said message.

36. The method of claim 1, wherein applying a set of conditional rules to the message field values and determined content payload to determine a healthcare communication network destination to which the received message should be directed comprises:
identifying via the application of the rules a medical practitioner recipient or medical department recipient from among a plurality of possible recipients none of whom are identified in said message.

37. The method of claim 36, wherein the set of conditional rules comprise rules for identifying a medical practitioner recipient or medical department recipient suited to respond to or act upon said message from among a plurality of possible medical practitioner or medical department recipients.

38. The method of claim 37, wherein the set of conditional rules further comprise rules for identifying the medical practitioner recipient or medical department recipient suited to respond to or act upon the clinical content of said message by identifying an appropriate medical specialty for the response.

39. The method of claim 38, wherein the message recipient comprises at least one of a healthcare professional, a medical team personnel, and a medical institution department suitable to respond to or act in response to said message.

40. The method of claim 1, wherein applying a set of conditional rules to the message field values and determined content payload to determine a healthcare communication network destination to which the received message should be directed comprises:
applying the set of conditional rules to determine a healthcare communication network destination from among a plurality of alternative network end destinations.

41. The method of claim 1, wherein parsing the received message to determine values for a set of message fields comprising parameters that characterize the received message comprises:
parsing the received message to determine values for parameters that characterize a medical subject domain pertaining to the content of the received message.

42. The method of claim 1, wherein parsing the received message to determine values for a set of message fields comprising parameters that characterize the received message comprises:
parsing the received message to determine values for parameters that characterize a clinical content of the received message.

43. The method of claim 42, wherein the clinical content comprises at least one of a patient condition, a patient study, a patient examination, a patient ailment, a patient body region, and a patient anatomical feature.

44. A computer processing system for processing messages within a healthcare communication network, the system comprising:

a network communications interface that permits communications between the system and the healthcare communication network; and a message processor coupled to the network communication interface, wherein the message processor is configured with software instructions to perform steps comprising:

receiving a message within a healthcare communication network in a HL7 format;

parsing the received message to determine values for a set of message fields comprising parameters that characterize the received message;

determining content payload of the received message;

applying a set of conditional rules to the message field values and determined content payload to determine a healthcare communication network destination to which the received message should be directed, wherein applying the set of conditional rules to the message field values comprises:

determining whether the received message contains a sufficient set of message field values to allow network destination to be determined through the application of the set of conditional rules; and in response to determining that the received message does not contain a sufficient set of message field values to allow the network destination to be determined:

populating any deficient message field values with default values; and applying the set of conditional rules to a complete set of message field values, wherein the complete set comprises the received message field values and the default values; and directing the received message to the determined healthcare communication network destination.

45. A system as defined in claim 44, wherein the message fields include system parameters of the network.

46. A system as defined in claim 45, wherein the system parameters include network bandwidth.

47. A system as defined in claim 45, wherein the system parameters include received message queue size.

48. A system as defined in claim 45, wherein the system parameters include network resource availability.

49. A system as defined in claim 44 wherein the message fields include a plurality of received message format parameters.

50. A system as defined in claim 49, wherein the received message format parameters include a message format of image data.

51. A system as defined in claim 49, wherein the received message format parameters include a message format of email data.

52. A system as defined in claim 49, wherein the received message format parameters include a message format of alphanumeric data.

53. A system as defined in claim 44, wherein the message fields include a set of message hierarchy fields.

54. A system as defined in claim 53, wherein the message hierarchy fields include Patient, Study, Series, Image, and Instance identification fields.

55. A system as defined in claim 44, wherein the message fields include a plurality of message content parameters.

56. A system as defined in claim 55, wherein the message content parameters include a report message that prompts a response message.

57. A system as defined in claim 55, wherein the message content parameters include an image message that prompts an analysis action.

58. A system as defined in claim 55, wherein the message content parameters include an image message that prompts an archive action.

59. A system as defined in claim 55, wherein the message content parameters include a response message that is associated with a request message.

60. A system as defined in claim 44, wherein the message processor is configured with software instructions to perform further steps comprising:

populating a plurality of data tables for the message according to the message field values.

61. A system as defined in claim 44, wherein the message processor is configured with software instructions to perform further steps comprising:

transforming the content of the received message.

62. A system as defined in claim 61, wherein the received message content comprises image data, and the system transforms the content by changing a format of the image data to a changed image data format.

63. A system as defined in claim 61, wherein the message processor is configured with software instructions to perform further steps comprising:

transforming the content by performing data compression on the received message content.

64. A system as defined in claim 61, wherein the message processor is configured with software instructions to perform further steps comprising:

transforming the content by creating a new data document for transmission over the network.

65. A system as defined in claim 64, wherein the message processor is configured with software instructions to perform further steps comprising:

creating the new data document in response to detecting that a capability of the determined destination to handle the message format is lacking, and wherein the new data document has a message format that can be handled by the determined destination.

66. A system as defined in claim 61, wherein the message processor is configured with software instructions to perform further steps comprising:

transforming the content by initiating a notification action.

67. A system as defined in claim 61, wherein the message processor is configured with software instructions to perform further steps comprising:

transforming the content by initiating a data storage action.

68. A system as defined in claim 61, wherein the message processor is configured with software instructions to perform further steps comprising:

transforming the content by initiating a message forwarding action.

69. A system as defined in claim 61, wherein the message processor is configured with software instructions to perform further steps comprising:

transforming the content by performing data compression on the message content.

70. A system as defined in claim 61, wherein the message comprises image data that is associated with an instance identifier, and the system transforms the content by changing a data format of the image data and assigning a changed instance identifier to the changed image data format.

71. A system as defined in claim 70, wherein the changed image data format comprises data in compliance with a compound file format.

72. A system as defined in claim 70, wherein the changed image data format comprises data in compliance with a single type format.

73. A system as defined in claim 72, wherein the single type format is either JPEG, JPEG2000, or raw raster format.

74. A system as defined in claim 44, wherein the message processor is configured with software instructions to perform further steps comprising:
determining if the message has been received for greater than a predetermined time limit without being directed to the determined destination and performs a notification action if the predetermined time limit has been exceeded.

75. A system as defined in claim 44, wherein the message processor is configured with software instructions to perform further steps comprising:
determining if follow up action is required for the message; and
scheduling a check for whether the follow up action occurs.

76. A system as defined in claim 75, wherein the message processor is configured with software instructions to perform further steps comprising:
generating a notification message if a time limit occurs without occurrence of the follow up action.

77. A system as defined in claim 44, wherein the message processor is configured with software instructions to perform further steps comprising:
determining content payload by detecting image data in the received message; and
performing image analysis on the image data to detect message payload content that is used in determining the healthcare communication network destination.

78. The system as defined in claim 44, wherein the processor is further configured to identify via the application of the rules to the message field values and the determined payload content a medical practitioner recipient or medical department recipient which is a suitable alternative recipient when a recipient who is directly identified in said message is not available to receive said message.

79. The system as defined in claim 44, wherein the processor is further configured to identify via the application of the conditional rules to the message field values and the determined payload content a medical practitioner recipient or medical department recipient from among a plurality of possible recipients none of whom are identified in said message.

80. The system as defined in claim 79, wherein the processor is further configured to identify via the set of conditional rules a medical practitioner recipient or medical department recipient suited to respond to or act upon said message from among a plurality of possible medical practitioner or medical department recipients.

81. The system as defined in claim 80, wherein the message recipient comprises a recipient suited to respond to or act upon a clinical content of said message.

82. The system as defined in claim 81, wherein the message recipient comprises at least one of a healthcare professional, a medical team personnel, and a medical department suitable to respond to or act in response to said message.

83. The system as defined in claim 44, wherein the processor is further configured to apply the set of conditional rules to determine a healthcare communication network destination from among a plurality of alternative network end destinations.

84. The system as defined in claim 44, wherein the processor is further configured to parse the received message to determine values for parameters that characterize a medical profession subject domain pertaining to the content of the received message.

85. The system as defined in claim 44, wherein the processor is further configured to parse the received message to determine values for parameters that characterize a clinically significant content of the received message.

86. The system as defined in claim 85, wherein the clinically significant content comprises at least one of a patient condition, a patient study, a patient examination, a patient ailment, a patient body region, and a patient anatomical feature.

* * * * *